United States Patent Office 2,882,075
Patented Apr. 14, 1959

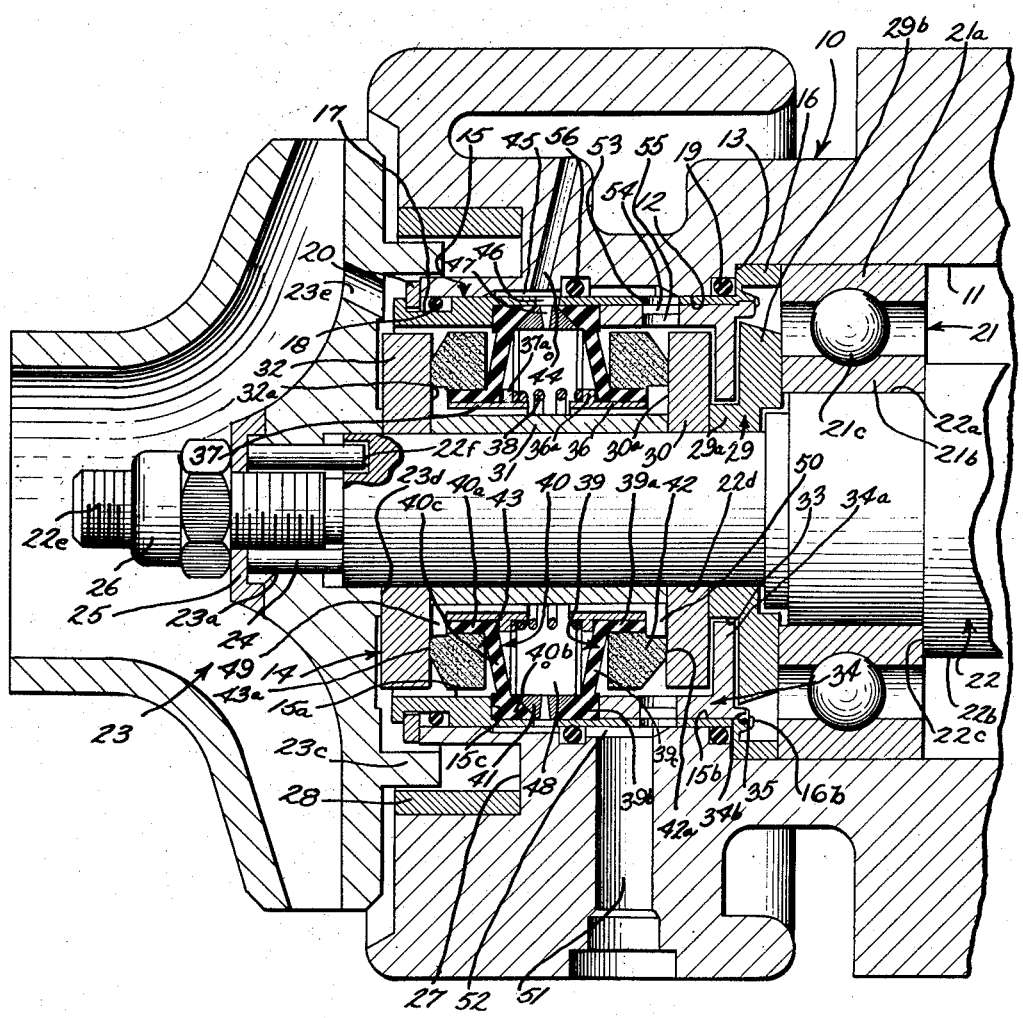

2,882,075

PUMP SEAL

Robert C. Biering, Bedford, and Donald L. Southam, Cleveland Heights, Ohio, assignors to Thompson Products, Inc., Cleveland, Ohio, a corporation of Ohio Application January 31, 1956, Serial No. 562,498

5 Claims. (Cl. 286—11)

This invention relates generally to a shaft seal, and more particularly to the combination of a face type seal and an auxiliary fluid seal. Specifically, the invention is useful in sealing against leakage along pump shafts, wherein the pump is required to handle abrasive or contaminated fluids, such as a fuel slurry with abrasive materials, although other uses and purposes may be apparent to one skilled in the art.

Heretofore, pumps handling abrasive and contaminated fluids were invariably limited in design life by the pump seal. Also, in the past, conventional seals have been damaged by inadvertent dry pump operation.

Therefore, it is an object of this invention to obviate the above named difficulties and provide a shaft seal which is particularly useful in pumps handling abrasive and contaminated fluids, wherein the design life of such a pump is not limited by the pump seal.

Another object of this invention is to provide an improved shaft seal which is particularly useful to prevent leakage of abrasive or contaminated fluids along the shaft.

A further object of the present invention resides in the provision of a face type seal for preventing the leakage of contaminated fluid along a shaft, wherein the fluid is exposed to the radially outward side of the sealing faces, whereby the particles in the contaminated fluid have a lesser tendency to intercede between the sealed faces because the rotation of the seal tends to induce a centrifugal force to the fluid and the contaminants.

A still further object of the present invention is in the provision of a face type seal for use with rotating machinery handling contaminated fluid, wherein leakage of the contaminated fluid is eliminated.

Another object of this invention is in the provision of the combination of a face type seal and an auxiliary fluid seal for use on shafts of pumps handling contaminated fluid, wherein there is a minimum loss of auxiliary fluid and a minimum dilution of contaminated fluid by the auxiliary fluid.

Still another object of the invention is to provide the combination of a face type seal and an auxiliary fluid seal for use on shafts of pumps handling contaminated fluid wherein the auxiliary fluid may be employed as a seal coolant in either high speed or high temperature applications by controlling the temperature of the auxiliary fluid introduced to the seal.

A further object of this invention is in the provision of the combination of a face type seal and an auxiliary fluid seal arrangement for use on pump shafts wherein dry pump operation is possible provided the auxiliary fluid is maintained.

In previously developed face type seals, it is well known, that, although the seals are manufactured with the utmost precision to insure surface flatness and smoothness, minute particles tend to work between the mating surfaces and ultimately cause the surfaces to separate when these seals are exposed to contaminated or abrasive fluids.

Therefore, it is also an object of this invention to provide a face type seal arrangement wherein the above described seal face separation is eliminated.

Other objects, features, and advantages of the invention will be apparent from the following detailed disclosure, taken in conjunction with the accompanying sheet of drawing, wherein like reference numerals refer to like parts, and in which:

On the drawings:

A preferred embodiment of the invention is shown in Figure 1 which represents an axial sectional view, with some parts in elevation, of a centrifugal pump embodying the invention.

As shown on the drawings:

Although the shaft seal constructed in accordance with the principles of the present invention is shown and described when employed in connection with a high speed fuel pump driven by an air turbine or other suitable prime mover, it will be understood that the sealing structure described and claimed can be effectively used wherever it is necessary to guard against leakage of an abrasive or contaminated fluid along a rotating shaft.

In Figure 1, a housing is generally indicated by the reference numeral 10 and includes a stepped bore defining a first enlarged recess 11 and a reduced diameter recess 12, there being an annular shoulder 13 formed therebetween.

The combination face type seal and auxiliary fluid seal unit of the present invention is indicated generally by the reference numeral 14 and includes a substantially cylindrical casing 15 received within the bore 12 of the housing 10. Adjacent the end of the casing 15 projecting into the housing 10 is an annular flange 16 which is arranged to engagingly abut the shoulder 13 formed between the recesses 11 and 12.

A peripheral groove 17 is formed in the surface of the casing 15 on the end that projects away from the housing 10 and receives a conventional O-ring gasket 18 arranged therein to provide a seal between the casing 15 and the walls of the recess 12 in the housing.

A second O-ring gasket 19 is provided directly adjacent the flange 16 for the same purpose. The casing 15 of the seal unit 14 is held in firm assembly with the housing 10 and in the recess 12 thereof by means of a split locking ring 20 which is received in the casing groove 17 to abut against one side thereof and the outer end of the housing 10.

A suitable pump shaft bearing, generally indicated by the numeral 21, includes an outer race 21a received within the recess 11 and abutting at one end against the casing flange 16, an inner race 21b, and a plurality of balls 21c interposed between the races. The inner race 21b receives a reduced diameter shaft portion 22a of a pump drive shaft 22. An enlarged diameter shaft portion 22b coacts with the portion 22a to form an abutment 22c which shoulders against the end of the inner bearing race 21b opposite to the end of the outer bearing race 21a that abuts the flange 16 of the casing 15 to hold the bearing 21 in position.

A second diametrically reduced shaft portion 22d projects away from the first reduced shaft portion 22a and carries on its free end a third diametrically reduced shaft portion 22e axially extending therefrom. The shaft portion 22e is threaded. A centrifugal impeller 23 is received over the end of shaft portion 22e and provided with a counterbore sized to be received over the end of the second reduced shaft portion 22d. The end face of the shaft portion 22d is provided with a plurality of holes 22f for receiving the ends of a plurality of drive pins 24, the other ends of which are received in slots 23a of the impeller 23 to lock the impeller to the shaft 22 for co-rotation therewith. Preferably, a pair of diametrically opposed slots 23a will be formed in the impeller 23 and a pair of drive pins 24 will be employed to lock the impeller to the shaft. To hold the drive pins 24 in position, a washer 25 is received on the shaft portion 22e to also abut against a portion of the impeller 23. A nut 26 is threadedly carried on the shaft portion 22e and in abutting relationship to the washer 25 to hold the assembly in position.

It will be noted that the housing 10 is provided with an annular groove 27 concentrically disposed relative to the recess 12 and arranged to receive in pressed relationship therewith a suitable metal wearing ring 28, wherein the groove cooperates with an axially extending annular rib 23c formed on the impeller 23 to define a high pressure seal of the labyrinth type which restricts the flow of high pressure fluid. Hence, it will be understood that high pressure fluid from the pump discharge is reduced to inlet pump pressure by this labyrinth seal and a reference passage 23e.

Referring now to the details of the seal unit 14, it will be noted that the shaft portion 22d receives adjacent the bearing 21 a shaft engaging portion 29a of an annular member 29. An offset annular flange portion 29b extends from the shaft engaging portion 29a to abut against the bearing 21. Also received on the shaft portion 22d and in abutting relationship with the annular member 29 is a rotating hard metal shaft ring or washer 30 which engagingly abuts on its other side a sleeve member 31. A second rotating hard metal shaft ring or washer 32 abuts the other end of the sleeve 31 on one side and a shoulder 23d of the impeller 23. Thus, tightening of the nut 26 on the end of the shaft 22 frictionally connects together the shaft 22, the inner race 21b of the bearing 21, the annular member 29, the shaft ring 30, the spacing sleeve 31, and the shaft ring 32, which abuts against the impeller 23 that is locked to the shaft, thereby causing these elements to co-rotate with the shaft. The shaft rings 30 and 32 are preferably lapped on one radial face so as to provide sealing faces 30a and 32a, respectively, these faces constituting rotating seal faces.

It will be noted that the offset flange portion 29b of the annular member 29 co-acts with the adjacent shaft ring 30 to define a radial groove 33 which co-acts with an inwardly extending radial flange 34a of a sleeve 34 to form a labyrinth type grease seal for the bearing 21. The bushing 34 is telescopically received within the inner end of the casing 15 and held in position against axial movement by an outwardly projecting radial shoulder 34b of the bushing that shoulders against an abutment 35 on the casing 15. A plurality of lugs 16b abut against the outer side of the shoulder 34b.

The casing 15 is provided with a generally cylindrical wall portion forming a plurality of stepped counter bores progressively increased in diameter toward the end of the casing that projects into the housing 10, and designated by the numerals 15a and 15b, respectively. Thus, an annular shoulder 15c is formed between the counter bores 15a and 15b.

A pair of cylindrical ferrules or tubes 36 and 37 encircle the sleeve 31 between the shaft rings 30 and 32 and are axially spaced from each other and from the corresponding adjacent shaft rings. The ferrules are provided near their adjacent ends with upstanding rims 36a and 37a, respectively which bottom on their oppositely facing sides the opposite ends of a coil spring 38 which biases the ferrules apart. The remote sides of the ferrule rims engagingly abut the inner ring portions 39a and 40a of a pair of flexible sleeve type diaphragms 39 and 40. The sleeve type diaphragms are made of a suitable elastic material. It may be noted that the ring portions 39a and 40a of the sleeves 39 and 40 constitute the inner ends of the sleeve and encircle and seat on the respective ferrules 36 and 37. The opposite ends of the sleeves 39 and 40 terminate in radially outwardly spaced ring-shaped portions 39b and 40b, respectively which engage the casing wall portion of the stepped bore 15b. The radially spaced ring-shaped portion of the sleeves 39 and 40 are interconnected by substantially radially extending webbed portions 39c and 40c respectively which are connected at their inner ends to the adjacent ends of the ring-shaped portions 39a and 40a, respectively and at their outer ends to the remote ends of the ring-shaped portions 39b and 40b, respectively. The outer ring-shaped portions 39b and 40b of the sleeves 39 and 40 are axially spaced by an annular spacing member 41 having a frusto-conical cross sectional shape and being engaged by the casing wall portion of the counter bore 15b. The outside end of the ring-shaped portion 39b of the sleeve 39 abuts a shoulder formed by the inner end of the bushing 34 that is telescopically received within the casing 15, while the outside end of the ring-shaped portion 40b abuts the shoulder 15c.

A pair of non-rotatable seal rings 42 and 43, respectively engage the shaft rings 30 and 32. Preferably the seal rings are made of a softer material than the shaft rings, for example carbon or the like, and are flexibly supported on the sleeves 39 and 40, respectively. Each of the seal rings are provided with radial bearing surfaces 42a and 43a, respectively, for sealingly engaging the sealing faces 30a and 32a, respectively, of the shaft rings. The flexible sleeve type diaphragms 39 and 40 engagingly abut the sides of the sealed rings 42 and 43, respectively, opposite the sealing faces thereof. Thus, the seal rings are forced into biased contact with the corresponding shaft rings. Hence, it is seen that the seal rings 42 and 43 are flexibly mounted to the seal casing 15 by the sleeve diaphragms 39 and 40 and held in mating contact with the shaft rings 30 and 32 by the spring 38 and the ferrules 36 and 37.

The face type seal comprising the seal ring 43 and the shaft ring 32 serve to prevent low pressure fluid in the pump chamber from flowing toward the pump bearing 21, and it is noted that the fluid is exposed to the radially outward side of the shaft ring 32. In this arrangement, any particles in a contaminated fluid have a lesser tendency to intercede between the seal faces because the rotation of the shaft ring tends to rotate the fluid adjacent the ring and thereby induces centrifugal force to the fluid and the contaminants.

Even though the rotation of the shaft ring 32 tends to induce the centrifugal force to the low pressure fluid and the contaminants, some of the contaminants or particles will tend to intercede between the seal faces and cause separation.

To prevent this phenomenon which would allow abrasive particles to work toward the pump shaft bearings, auxiliary fluid, free from any contaminants or abrasive particles is introduced against the inner radial end of the sealing faces between the shaft ring 32 and the seal ring 43 at a pressure higher than the pressure of the fluid at the outer end of the sealing faces. This clean fluid is introduced through the housing 10 by a passageway or channel 44 which communicates with an annular groove or channel 45 formed in the housing 10. The groove coacts with the casing 15 to define an annular chamber. A plurality of circumferentially spaced apertures 46 are formed in the casing 15 in the locale of the annular passageway 45 and these apertures are in alignment with a similar number of apertures 47 formed in the spacing ring 41. After the fluid passes through the apertures 46 and 47, it enters a somewhat annular chamber 48 formed between the sleeve diaphragms 39 and 40.

It is noted that the ferrules 36 and 37 which encircle the spacing sleeve 31 are sized somewhat diametrically larger thereof to provide annular passageways which intercommunicate the chamber 48 with an annular-shaped chamber 49 adjacent the sealing faces of the shaft ring 32 and the seal ring 43, and an annular-shaped chamber 50 adjacent the sealing faces of the shaft ring 30 and the seal ring 42. Thus, the auxiliary clean fluid is capable of purging the contaminants which tend to intercede between the seal faces of the shaft ring 32 and the seal ring 43. Loss of the auxiliary fluid is prevented by the sealing faces of the shaft ring 30 and the seal ring 42. The auxiliary fluid may be further used to advantage as a seal coolant in either high speed or high temperature applications.

The outer radial margin of the face type seal effected by the engagement of the stationary seal ring 42 and the rotatable shaft ring 30 is vented to the atmosphere through a venting passageway or seal drain 51. The seal drain 51 communicates with an annular groove 52 formed in the housing 10 which defines with the casing 15 a passageway. This passageway leads to the outer sealing faces of the face type seal defined by the shaft ring 30 and the seal ring 42 through a plurality of circumferentially spaced apertures 53 in the casing 15, an annular groove 54 formed in the bushing 34, and a plurality of circumferentially spaced apertures 55 formed in the bushing 34. Hence, any leakage of the auxiliary fluid past the sealing faces of the shaft ring 30 and the seal ring 42 is vented to the atmosphere. It will be noted that the annular groove 52 in the housing 10 is separated from the annular groove 45 by a conventional O-ring gasket 56 which is received in a circumferential groove in housing 10 and engages the outer surface of the casing 15.

From the foregoing, it will be understood that the sealing arrangement of the present invention constitutes a combination face type seal and auxiliary fluid seal which may be effectively used on shafts or pumps handling abrasive or contaminated fluids with long lived operation.

It will be understood that modifications and variations may be effected without departing from the scope of the novel concepts of the present invention, but it is understood that this application is to be limited only by the scope of the appended claims.

We claim as our invention:

1. A shaft seal comprising, in combination, a pair of removable shaft rings each lapped on one face and a removable sleeve adapted to be co-rotatably mounted in axial alignment on a rotatable shaft, said sleeve being clamped between said rings and serving as a spacer, a casing having a generally cylindrical wall portion forming a plurality of stepped counterbores increasing in diameter toward one end thereof arranged around said shaft in the locale of the shaft rings, a pair of ferrules, surrounding said shaft and being disposed between said shaft ring, said ferrules being sized to define annular passageways with the shaft and having outwardly projecting radial flanges at their adjacent ends, a coil spring bottomed at opposite ends on the flanges of the ferrules to urge them apart, a first flexible diaphragm sleeve having one end snugly seated on one of the ferrules and abutting against the corresponding flange and the other end engaging said wall portion of said casing and shouldered against a first annular abutment formed between said stepped counterbores, a first annular seal ring encircling said one end of said first diaphragm sleeve and having a radial side arranged to engage one radial face of one shaft ring only radially inward of the periphery of said face under the bias of said coil spring, a second flexible diaphragm sleeve having one end snugly seated on the other ferrule and abutting against the corresponding flange and the other end engaging said wall portion of said casing, a bushing telescopically received within the adjacent end of said casing to provide an abutment for said other end of said second flexible sleeve, a second annular seal ring encircling said one end of said second sleeve and having a radial side arranged to engage one radial face of the other shaft ring only radially inward of the periphery of said face under the bias of said coil spring, and means for introducing a remotely pressurized fluid intermediate said flexible diaphragm sleeves and to the inner end of the sealing faces defined by said engaging shaft ring faces and seal ring sides.

2. A shaft seal comprising, in combination, a pair of removable shaft rings each lapped on one face and a removable sleeve adapted to be co-rotatably mounted in axial alignment on a rotatable shaft, said sleeve being clamped between said rings and serving as a spacer, a casing having a generally cylindrical wall portion forming a plurality of stepped counterbores increasing in diameter toward one end thereof arranged around said shaft in the locale of the shaft rings, a pair of ferrules, surrounding said shaft and being disposed between said shaft ring, said ferrules being sized to define annular passageways with the shaft and having outwardly projecting radial flanges at their adjacent ends, a coil spring bottomed at opposite ends on the flanges of the ferrules to urge them apart, a first flexible diaphragm sleeve having one end snugly seated on one of the ferrules and abutting against the corresponding flange and the other end engaging said wall portion of said casing and shouldered against a first annular abutment formed between said stepped counterbores, a first annular seal ring encircling said one end of said first diaphragm sleeve and having a radial side arranged to engage one radial face of one shaft ring only radially inwardly of the periphery of said face under the bias of said coil spring, a second flexible diaphragm sleeve having one end snugly seated on the other ferrule and abutting against the corresponding flange and the other end engaging said wall portion of said casing, a bushing telescopically received within the adjacent end of said casing to provide an abutment for said other end of said second flexible sleeve, a second annular seal ring encircling said one end of said second sleeve and having a radial side arranged to engage one radial face of the other shaft ring only radially inward of the periphery of said face under the bias of said coil spring, an annulus having a series of radial apertures and positioned between said other ends of said sleeves and engaging the wall portion of said casing, a series of apertures in said casing aligned with the apertures of said annulus, and a housing surrounding said casing and defining with said casing an annular chamber connecting said casing apertures for supplying a remotely pressurized fluid through all of said appertures and between said diaphragms which pressure forces fluid through said annular passageways and purgingly through the radial sealing faces defined by said shaft rings and said seal rings.

3. A shaft seal including a pair of shaft rings axially spaced along a shaft for co-rotation therewith, a casing having a generally cylindrical wall portion surrounding the shaft in the locale of the shaft rings, said portion having apertures, a pair of axially aligned bushings encircling said shaft between said shaft rings, said bushings being axially spaced from the corresponding shaft ring and from each other and being of such diametral size as to define annular passageways with the shaft surface, means for biasing said bushings apart, a pair of flexible diaphragm sleeves, each having one end seated on a bushing and the other end engaging said wall portion of said casing, means on said casing preventing axial shifting of said other ends of said sleeves, means on said bushings preventing said one ends of said sleeves form shifting towards each other, a radially apertured spacing ring between said other ends of said sleeves seating on and aligned with the apertures in said wall portion of said casing, a pair of seal rings encircling said one ends of each sleeve and having one radial side in biased engagement with a radial face of a shaft ring, and a housing surrounding said cylindrical wall portion and defining therewith a pair of separate annular chambers, one of said annular chambers with said apertures comprising means for introducing pressurized fluid between said sleeves to force fluid past the sealing faces of the shaft and seal rings, the other of said annular chambers collecting and draining fluid which has been forced past one of said seal rings.

4. A shaft seal including a pair of shaft rings axially spaced along a shaft for co-rotation therewith, a casing having a generally cylindrical wall portion surrounding the shaft in the locale of the shaft rings, a pair of axially aligned bushings encircling said shaft between said shaft rings, said bushings being axially spaced from the corresponding shaft ring and from each other and being of such diametral size as to define annular passageways with the shaft surface, means for biasing said bushings apart, a pair of flexible diaphragm sleeves, each including a first end portion seated on one of said bushings and a radially outwardly spaced end portion engaging said wall portion of said casing, said ends of each sleeve connected by a substantially radially extending web portion, means on said casing preventing axial shifting of said outwardly spaced end portions including a spacing ring between the adjacent ends thereof, a pair of seal rings encircling said first end of each sleeve and engaged at one side by the corresponding web portion and engaging at the other side the adjacent radial face of the adjacent shaft ring, said spacing ring having a series of circumferentially spaced radial apertures, said casing having a series of circumferentially spaced holes aligned with said apertures, and means for introducing a supply of pressurized fluid from a zone of increased pressure through all of said apertures and holes to the inner ends of the radial sealing faces of said shaft and seal rings, whereby the pressurized fluid, which has no other exit path, will escape between said sealing faces and thereby purge away any particles tending to intercede therebetween.

5. A shaft seal including a pair of shaft rings axially spaced along a shaft for co-rotation therewith, a casing having a generally cylindrical wall portion surrounding the shaft in the locale of the shaft rings; a pair of axially aligned bushings encircling said shaft between said shaft rings, said bushings being axially spaced from the corresponding shaft ring and from each other and being of such diametral size as to define annular passageways with the shaft surface; means for biasing said bushings apart; a pair of flexible diaphragm sleeves, each sleeve having an inner end seated on one of said bushings and abutting at said inner end against a radial flange carried by each bushing, each sleeve having an outer end engaging said wall portion of said casing; a circumferentially apertured ring engaging one side of and axially spacing said outer ends of the diaphragm sleeves; abutments provided on said casing shouldered against the other sides of said outer ends; a seal ring encircling each of the inner ends of the sleeves having one face in engagement with a radial face of the adjacent shaft ring and a portion of the other side in biased contact with said corresponding sleeve; a plurality of circumferentially spaced apertures in said casing aligning with the apertures in the spacing rings; a housing surrounding said cylindrical wall portion and defining therewith a pair of separate annular chambers, one of said annular chambers communicating with said apertures; and a pressurized fluid between said sleeves received through the apertures to force fluid purgingly past the inner ends of the sealing face between the shaft and seal rings; the other of said annular chambers collecting and draining fluid which has been forced past one of said seal rings.

References Cited in the file of this patent

UNITED STATES PATENTS

| 1,505,321 | Dennedy | Aug. 19, 1924 |
| 2,226,001 | La Bour | Dec. 24, 1940 |
| 2,712,459 | Wahl | July 5, 1955 |
| 2,749,156 | Cliborn | June 5, 1956 |